J. S. Simmerman,
Applying Electricity in Extracting Teeth.
N° 21,853.    Patented Oct. 19, 1858.
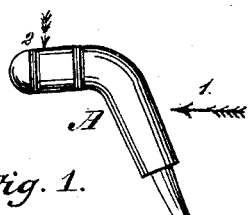
Fig. 1.
Fig. 2.
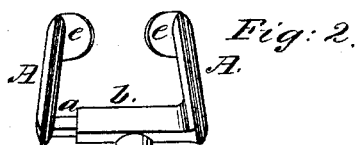
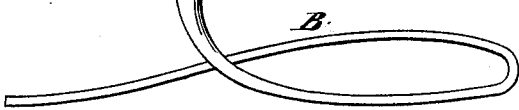
Fig. 3.
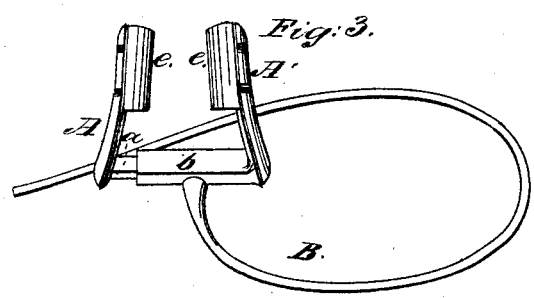

UNITED STATES PATENT OFFICE.

JACOB S. SIMMERMAN, OF GLASSBOROUGH, NEW JERSEY.

IMPROVEMENT IN METHOD OF APPLYING ELECTRICITY DURING EXTRACTION OF TEETH.

Specification forming part of Letters Patent No. 21,853, dated October 19, 1858.

*To all whom it may concern:*

Be it known that I, JACOB S. SIMMERMAN, of Glassborough, in the county of Gloucester and State of New Jersey, have invented a new and Improved Mode of Applying Electricity during the Extraction of Teeth; and I do hereby declare the following to be a full and exact description of the same, reference being had to the accompanying drawings, and to the letters of reference marked thereon.

My invention consists in applying electricity to the gum or teeth, or both, near the tooth to be extracted, through the medium of an insulated and adjustable spring-clip, connected to that class of electro-magnetic machines in which the intensity of the shock may be regulated at pleasure.

The object of my invention is to gradually render the gum and teeth insensible to pain prior to the lancing of the gum and subsequent extraction of the tooth, and to gradually withdraw the electrity and gradually restore sensibility to the gum and teeth after the tooth has been extracted, thereby avoiding the disagreeable and painful shocks felt by the patient on applying the forceps, and the equally painful sensation felt after the extraction of the tooth when electricity has been applied through the medium of the forceps.

In order to enable others to practice my invention, I will now proceed to describe the mode in which I carry it into effect.

On reference to the accompanying drawings, which form a part of this specification, Figure 1 is a side view (full size) of the instrument wherewith I apply electricity to the gums of a patient during the extraction of teeth; Fig. 2, a plan looking in the direction of the arrow 1, Fig. 1; Fig. 3, a plan looking in the direction of the arrow 2, Fig. 1.

A and A' are two metal springs, the spring A being attached to or forming a part of a rod, $a$, which is arranged to fit snugly, but so as to slide freely, in a socket, $b$, which is attached to or forms a part of the spring A'. Each of the springs is furnished on the inside and near its ends with a pad, $e$, of cloth, felt, or other substance capable of absorbing moisture. To the socket $b$ is connected one end of the flexible conducting-wire B, the opposite end being connected to one of the poles of that class of electro-magnetic machines in which the intensity of the electric current may be readily graduated by the operator.

It will be seen that the above-mentioned instrument forms an adjustable spring-clip, as by sliding the rod $a$ in or out of the socket the distance between the opposite pads may be increased or diminished at pleasure, the elasticity or griping effect of the springs being available at whatever distance the rod $a$ may project from the socket.

It should be understood that the conducting-wire B is coated with gum-elastic, gutta-percha, or other non-conducting material, and that the socket $b$ is insulated, as are also the springs A and A', with the exception of that portion to which the pads are attached.

The above-described insulated and adjustable spring-clip, with its moistened pads, is in the first instance adjusted to the gum or teeth, or both, of the patient, in as close proximity to the tooth to be extracted as will enable the operator to have a free use of his forceps without disturbing the clip. The conducting-wire B is connected to one of the poles of the battery, and the patient grasps in his hand a conductor from the opposite pole. The operator then graduates the battery until the desired amount of electricity is imparted to the gum or teeth through the clip and its moistened pads. The jaw, in the neighborhood of the tooth to be extracted, has now become gradually insensible without any sudden and painful shock. The operator, after taking the preliminary steps of lancing the gum, applies any of the ordinary forceps. After the tooth has been withdrawn the insulated clip is allowed to remain attached to the jaw for a short time, when the electricity is gradually reduced and the clip withdrawn.

I am aware that electricity has been heretofore applied during the extraction of teeth, and that a patent for a combination of an electro-magnetic machine with dental forceps has been granted to Dr. Francis for this purpose. In practicing his invention, however, the patient is subjected to a pain if not as intense, at least almost as annoying, as that caused by the extraction of the teeth in the ordinary manner without the application of electricity. As the electricity in Dr. Francis's mode is only applied when the forceps are attached to the teeth the patient must submit to the disagreeable preparatory operation of lancing, as usual. The sudden shock, too, on the application of the forceps, is almost as annoying as the extraction of the tooth in the usual manner. Another disadvantage in Dr. Francis's mode is that the current of electricity ceases as soon as the tooth is withdrawn, and a sudden pain, consequent upon the extraction of the tooth, takes place.

It will be seen without further description that by my improved mode of applying electricity during the extraction of teeth the above inconveniences and defects are avoided.

It will also be seen that the instrument may be considerably modified in form without any change in the result. In some instances the clip may be so constructed that one of the pads shall press against the cheek of the patient on the outside of the mouth, and the other against the gum or teeth on the inside of the mouth.

I claim and desire to secure by Letters Patent—

Applying electricity to the gums or teeth, or both, during the operation of extracting teeth, by means of the insulated adjustable spring-clip herein described or its equivalent, the said clip being connected to one of the poles of an adjustable electro-magnetic machine or its equivalent, as herein set forth, and for the purpose specified.

In testimony whereof I have signed my name to this specification before two subscribing witnesses.

JACOB S. SIMMERMANN.

Witnesses:
HENRY HOWSON,
HORACE SEE.